United States Patent
Lam et al.

(10) Patent No.: US 7,254,296 B2
(45) Date of Patent: Aug. 7, 2007

(54) APPARATUS FOR IMPROVED FIBER OPTIC COUPLING EFFICIENCY

(75) Inventors: Sio Kuan Lam, Kowloon (HK); Ka Suen Lee, Kowloon (HK); Shing Lui Lau, Kowloon (HK); Kwok Sing Cheng, New Territories (HK); Mark Wing-Keung Mak, New Territories (HK); Fuk Kay Frank Tong, New Territories (HK)

(73) Assignee: SAE Magnetics (Hong Kong) Limited, Kwai Chung (HK)

( * ) Notice: Subject to any disclaimer, the term of this patent is extended or adjusted under 35 U.S.C. 154(b) by 0 days.

(21) Appl. No.: 10/755,383

(22) Filed: Jan. 13, 2004

(65) Prior Publication Data

US 2004/0175072 A1 Sep. 9, 2004

Related U.S. Application Data

(60) Provisional application No. 60/440,344, filed on Jan. 16, 2003.

(51) Int. Cl.
*G02B 6/32* (2006.01)
(52) U.S. Cl. .......................................... 385/33; 385/31
(58) Field of Classification Search ............... 385/31, 385/33–35, 61, 74, 79; 359/355, 362, 366
See application file for complete search history.

(56) References Cited

U.S. PATENT DOCUMENTS 3,628,027 A * 12/1971 Brauss ....................... 250/216
5,175,783 A * 12/1992 Tatoh ........................... 385/93
5,388,171 A * 2/1995 Michikoshi et al. .......... 385/36
5,682,449 A * 10/1997 Taira-Griffin ................. 385/47
6,856,728 B2 * 2/2005 Zhang ........................... 385/33

FOREIGN PATENT DOCUMENTS

JP 07-270642 * 10/1995

* cited by examiner

*Primary Examiner*—Jennifer Doan
(74) *Attorney, Agent, or Firm*—Bingham McCutchen LLP (57) ABSTRACT

An optical assembly incorporates a compact and efficient lens for coupling a beam of light from an optical device to an optical fiber. The lens includes a curved reflecting surface and a focusing surface. The lens is positioned to receive and internally reflect the beam of light from the optical device toward the focusing surface. The focusing surface in turn focuses the reflected beam into the end of an optical fiber. The curved surface may include a reflective coating for transmitting a portion of the beam toward a monitoring unit which is used to monitor a parameter of the beam. The optical assembly may further include a platform for supporting the optical device, the lens, the optical fiber and the monitoring unit.

17 Claims, 6 Drawing Sheets

APPARATUS FOR IMPROVED FIBER OPTIC COUPLING EFFICIENCY

CROSS REFERENCE TO RELATED APPLICATIONS

This application claims the benefit of U.S. Provisional Application Ser. No. 60/440,344 filed Jan. 16, 2003.

FIELD OF THE INVENTION

The present invention relates generally to optical assemblies for coupling the light from light emitting devices to fiber and, more particularly, to optical assemblies that incorporate a reflecting curved surface and a focusing spherical curved surface that efficiently couple the light from a vertically emitted laser to a horizontally placed optical fiber.

BACKGROUND OF THE INVENTION

Optical fiber technology is well suited for communications applications because optical fibers have a wide transmission bandwidth and relatively low attenuation. In most applications, the electrical signal is first converted into an optical signal via a light emitting device such as a semiconductor laser. The optical signal is in turn coupled into an optical fiber for transmission of the optical signal. Conventionally, optical coupling assemblies have been designed in such a way that the light emitting device, all optical components, and the fiber are all aligned in line along the path of light. An advantage of this alignment scheme is that the optical assemblies are relative simple and can be made with only one simple optical component such as a ball lens. However, when the fiber is not placed in line with the light emitting device, the optical coupling assemblies must be well designed to achieve efficient optical coupling.

Recent development and progress in high speed vertical cavity surface emitting laser ("VCSEL") technology and the rise of metropolitan fiber communication market have combined to create a need for high-speed optical transmitting devices based on VCSEL technology and relevant optical coupling assemblies. However, the use of VCSEL technology has imposed strict requirements for high power coupling efficiency and high mode coupling efficiency within optical coupling assemblies. This is because VCSEL devices convert the received electrical signal into different laser transmission modes, each having a different spatial distribution. The transmitted optical signal can be properly received only when all laser modes are coupled with even loss. Therefore, proper design of the optical coupling assemblies for efficient optical coupling from light emitting/receiving devices to fiber has been a persistent challenge.

Coupling assemblies should also allow large optical alignment tolerances to be induced by the manufacturing process. Alignment problems during assembly are exacerbated by the trends toward miniaturization of over-all size of optical transmitting/receiving devices and toward lower cost materials. The miniaturization of optical assemblies themselves requires that the optical coupling must be completed with high efficiency within a small volume. The volume or dimension requirement, however, limits the size and number of optical components that can be used in an assembly.

Notwithstanding the trend-toward miniaturization, a complicated optical assembly is generally necessary in order to achieve high power coupling and high mode coupling between two orthogonal directions, such as vertical and horizontal direction. Such optical coupling assemblies are usually bulky and require multiple optical components. This imposes additional assembling and alignment difficulties and cost on the manufacturing and is at odds with the goal of miniaturization.

In addition, optical devices, including vertical or edge emitting devices, may need to be monitored to ensure that the transmitted beam has certain characteristics. This requires a monitoring unit to be positioned within the light path of the optical devices, thus adding complexity in the optical coupling assemblies and additional space requirement to accommodate the monitoring unit itself.

Accordingly, there is a need for a compact optical assembly that incorporates VCSEL technology and techniques for efficient coupling between the laser and the fiber. There is a further need for an optical assembly that is easy to manufacture, assemble and align. There is a further need for an optical coupling assembly that has a small footprint to facilitate its use in small volume optical assemblies.

SUMMARY OF THE INVENTION

According to one embodiment of the present invention, an optical assembly is provided that incorporates a compact and efficient lens for coupling a beam of light from an optical device to an optical fiber. The lens includes a focusing curvature and a spherical surface. The lens is positioned to receive, internally reflect and collimate the beam of light from the optical device toward the spherical surface. The spherical surface in turn focuses the reflected collimated beam into the end of an optical fiber. For many applications, a portion of the beam is needed to transmit toward a monitoring unit which is used to monitor a parameter of the beam. For this purpose, the focusing curvature can be partially coated with partially reflecting thin film, such as dielectric and/or metallic thin film, in order to ensure desirable reflectance and transmittance properties. In many applications, for the ease of assembly, alignment and low cost, the optical assembly may be molded into a unit part which includes a mechanical structure that engages the lens, optical device, sleeve, housing and/or optical fiber connector. The optical device may be a laser emitting device that produces a coherent beam of light or a non-laser device that produces an incoherent beam. The optical device may incorporate vertical or edge emitting technology. The reflecting curved surface and the spherical surface may be part of an integrated lens. Alternatively, the lens may be a lens assembly having at least two mating parts. One mating part may include the reflecting curved surface and another mating part may include the spherical surface. The lens may further include a mating surface that engages the platform for supporting the optical device, lens and/or electronic devices. It may also include a beam coupling surface that is translucent and positioned to convey the beam from the optical device to monitoring diode.

The optical assembly may further include a translucent block positioned between the lens and the end of the fiber. The translucent block reduces backward propagation of the beam toward the optical device. To facilitate assembly and alignment, the block may include an engaging surface for engaging the end of the optical fiber. In this embodiment, the focal point of the focusing surface may be coincident with or near the engaging surface.

According to another embodiment of the present invention, the lens comprises a lens assembly having mating parts that include mating surfaces in the optical path of the beam that engage each other. One or both mating surfaces may include a reflective portion that is shaped to reflect a portion of the beam along a monitoring path. The reflective portion may comprise all of the mating surfaces or a portion of the mating surface. In addition, the reflective portion of at least one of the mating surfaces may include a coating to create a desired reflection of the beam. Moreover, the mating surfaces may each include at least one alignment surface that facilitates alignment of the mating surfaces relative to each other during engagement.

BRIEF DESCRIPTION OF THE FIGURES

The above described features and advantages of the present invention will be more fully appreciated with reference to the detailed description and accompanying figures, which present illustrative embodiments that are not intended to limit the invention.

DETAILED DESCRIPTION

According to one embodiment of the present invention, an optical assembly is provided that incorporates a compact and efficient lens for coupling a beam of light from an optical device to an optical fiber. The lens includes a parabolic curved reflecting surface and a spherical surface. The lens is positioned to receive and internally reflect the beam of light from the optical device toward the focusing surface. The spherical surface in turn focuses the reflected beam into the end of an optical fiber. The parabolic surface may include a partially reflective coating for transmitting a portion of the beam toward a monitoring unit which is used to monitor a parameter of the beam. The optical assembly may further include a platform for supporting the optical device, the lens, the optical fiber and the monitoring unit.

The lens according to the present invention may be implemented in any optical coupling assembly that includes an optical device and an optical fiber and an optional monitoring device. FIGS. 1–5 describe various embodiments of the lens and assemblies incorporating the lens according to embodiments of the present invention.

Figure 1:
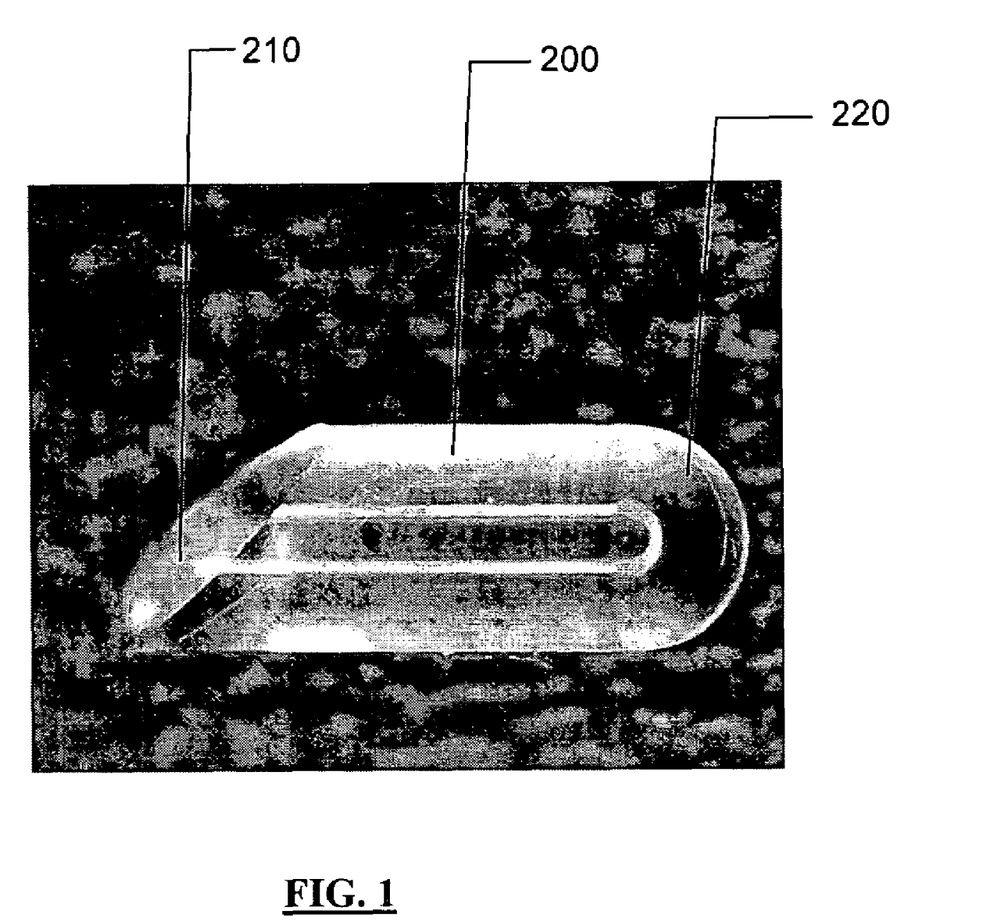
FIG. 1 depicts an illustrative embodiment of a lens of an optical assembly according to an embodiment of the present invention.

FIG. 1 depicts a lens according to an embodiment of the present invention. Referring to FIG. 1, the lens 200 is shown to be substantially cylindrical. It will be understood, however, that the lens may take other convenient shapes that allow it to be conveniently incorporated within an assembly and to optically communicate between a fiber and an optical component as described herein. The lens 200 includes at least two curved surfaces 210 and 220.

The surface 210 is a reflecting curved surface used for light-bending and for light confinement purposes. The light bending function refers to bending the light received from an optical device such as a light-emitting device toward the surface 220. The light confinement purpose refers to controlling the light beam that originates from the light emitting device from further diverging or from diverging more than a predetermined amount. The reflecting curved surface may be implemented as a parabolic surface, as one example. The parabolic surface can bend and reflect the light from the light emitting device to more or less than 90 degrees to reach the curved surface 220 and at the same time substantially collimate the light beam upon reflection. The reflecting curved surface does not have to be parabolic, however, and may have any convenient shape and characteristics that permit it to perform light bending and light confinement or collimation for conveying an appropriately shaped beam to the curved surface 220. The surface 210 may be covered with a special coating to enable an approximately 90-degree internal reflection of the light received from a bottom surface indicated in FIG. 2A as the surface 230. The coating may also be chosen to allow transmission of a portion of the light through the surface 210 for monitoring or other use.

The curved surface 220 is a focusing curved surface. The focusing curved surface focuses the light beam received from the curved reflecting surface to reach the coupling surface of a receiving device such as an optical fiber or optical receiver. As one example, the focusing surface may be implemented as is a spherical surface. However, the focusing surface does not have to be spherical and may be implemented as any other convenient shape for conveying a focused beam to an optical receiving device. The focusing feature of the lens is designed to facilitate concentrating a beam received from an optical device at a focal point off of the lens. An optical fiber may then be positioned within an optical assembly with one end at or around the focal point to permit efficient coupling of the beam from the optical component into the fiber. Alternatively, for a receiving optical component, light received from the fiber at the focal point is transmitted substantially collimated back to the collimating, reflecting surface 210. This surface focuses the beam and reflects it through the lower surface 230 to the receiving optical component.

Figure 2A:
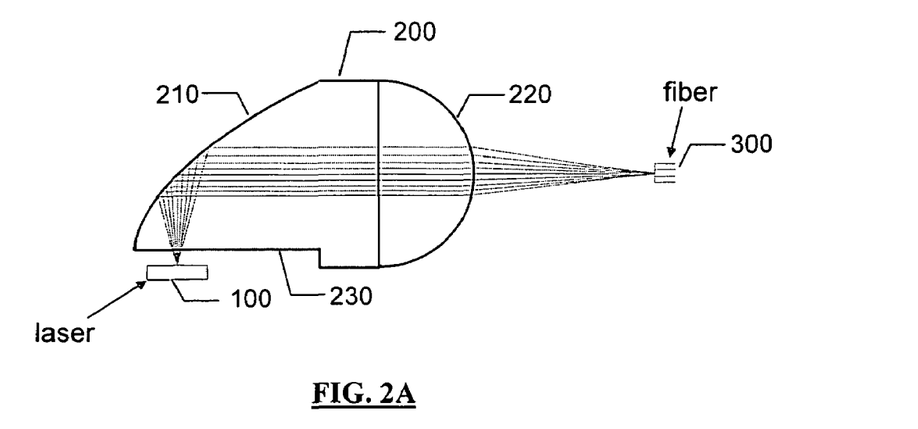
FIG. 2A depicts a light emitting device and its relationship with a lens having a flat lower surface according to an embodiment of the present invention.

FIG. 2A depicts an optical component and its relationship within an assembly to a lens 200 according to an embodiment of the present invention. Referring to FIG. 2A, the lens 200 may be positioned in the path of a beam projected by the optical component. The optical component may project a beam of coherent or non-coherent light. The beam generally travels away from the surface of the component approximately perpendicular to the reflecting curved surface. However, the angle may vary from perpendicular depending on the type of component implemented and the manufacturing processes and variations that were used in creating the component.

Figure 2B:
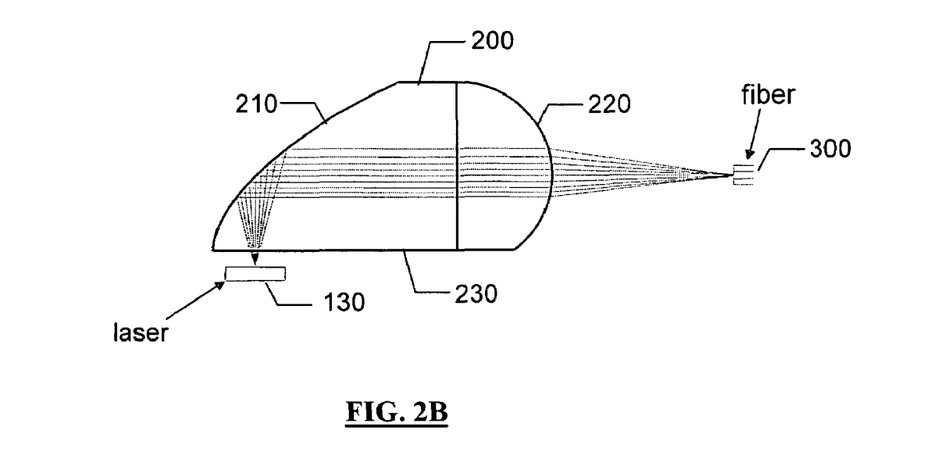
FIG. 2B depicts a light emitting device and its relationship with a lens according to another embodiment of the present invention.

In FIG. 2B, the lens 200 is positioned with a lower surface 230 situated in the path of the beam from the component 100. The lens 200, as well as the lower surface 230, is translucent so that the beam projected by the component 100 enters the lens and travels toward the reflective surface 210. The lens 200 may be positioned so that the most, if not, all of the beam projected by the component 100 enters the lens and reflects off at the reflective surface 210. The lower surface 230 may be substantially cylindrical as shown in FIG. 2B. Alternatively, the lower surface 230 may be flat as shown in FIG. 2A.

After the beam enters the lower surface of the lens, it is reflected off at the curved, reflective surface 210 and travels toward the focusing surface 220 along the length of the lens. The curved, reflective surface may be chosen to collimate the beam so that it travels substantially as a column toward the focusing surface 210. The shape of the curved, reflective surface may be at any shape and is generally chosen to produce a desired focal point when a beam traverses the curved reflecting surface and the focusing lens. The lens may be shaped with particular optical components in mind to produce an optimally shaped beam for particular components.

The focusing surface is designed to receive the reflected beam and focus the beam at a point outside the lens. The lens may be molded as a single unit. Alternatively, the lens may be molded as two separate pieces with one piece including the surface 210 and the other piece including the surface 220. The pieces may then be adhered together. The lens may be made of plastic, glass or any other convenient material.

The center of an edge of a fiber 300 may be positioned at or around the focusing point defined by the focusing surface 220 of the lens 200. In this manner, the beam from the optical component 100 may be projected as a focused beam into the core of the fiber 300. This allows efficient coupling of the optical signal into the fiber.

Figure 2C:
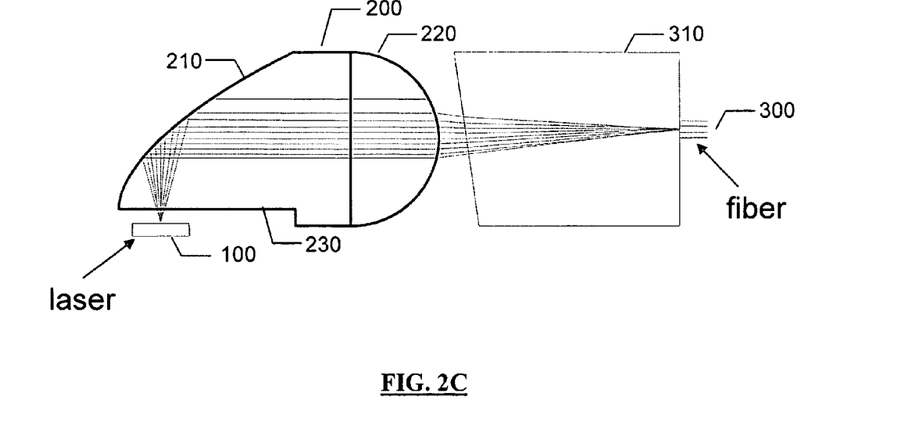
FIG. 2C depicts a light emitting device and its relationship with a lens according to another embodiment of the present invention.

FIG. 2C depicts an alternative embodiment of the present invention pursuant to which a translucent block is used as an intermediary between the focusing surface 220 of the lens 200 and the edge of the optical fiber 300. Referring to FIG. 2C, the block 310 is positioned in the optical path between the lens 200 and the optical fiber 300. The block 310 is translucent and includes a surface that generally faces the lens and a surface that generally faces the optical fiber. The surface that faces the lens may be cut at an angle to the direction of travel of the beam emanating from the focusing surface in order to prevent or minimize reflection of the beam back into the lens 200. The surface of the block that faces the optical fiber 300, referred to as the engaging surface, may be perpendicular to the direction of the beam or may have any other convenient angle.

The block 310 may be chosen to have a refractive index and length along the direction of travel of the beam so that the focusing point of the beam is at or around the engaging surface of the block. In addition, during assembly, the edge of the optical fiber may be positioned against the engaging surface of the block with its center substantially at the focal point of the beam. Having the beam focused on or around the engaging surface 310 of the block facilitates aligning an optical fiber so that its edge is at or around the focal point. This is because the edge of the optical fiber may be butted against the engaging surface of the block to properly position the edge of the optical fiber at the focal point.

Figure 3:
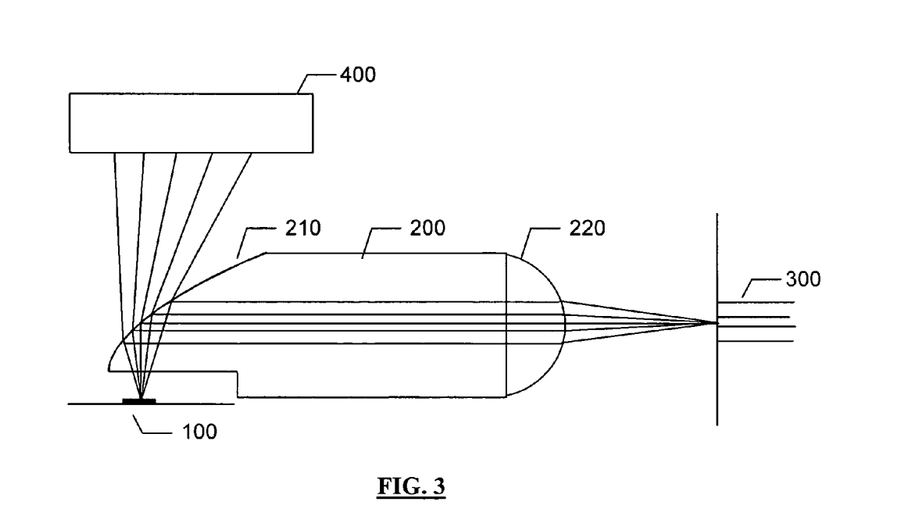
FIG. 3 depicts an optical assembly including a monitoring unit according to an embodiment of the present invention.

FIG. 3 depicts an embodiment of an optical assembly and lens, as shown in FIG. 2, which further includes a monitoring unit 400. The optical device transmits a beam that is coupled into the lens 200 toward the curved reflecting surface 210. A portion of the beam may be transmitted through the curved reflective surface toward the monitoring unit. The curved reflective surface may include a dielectric or metallic coating used to adjust the reflectivity of the curved reflective surface and determine the amount of the beam that is transmitted to the monitoring unit 400. The monitoring unit may be used to receive the transmitted portion of the beam and monitor at least one parameter associated with the beam.

Figure 4A:
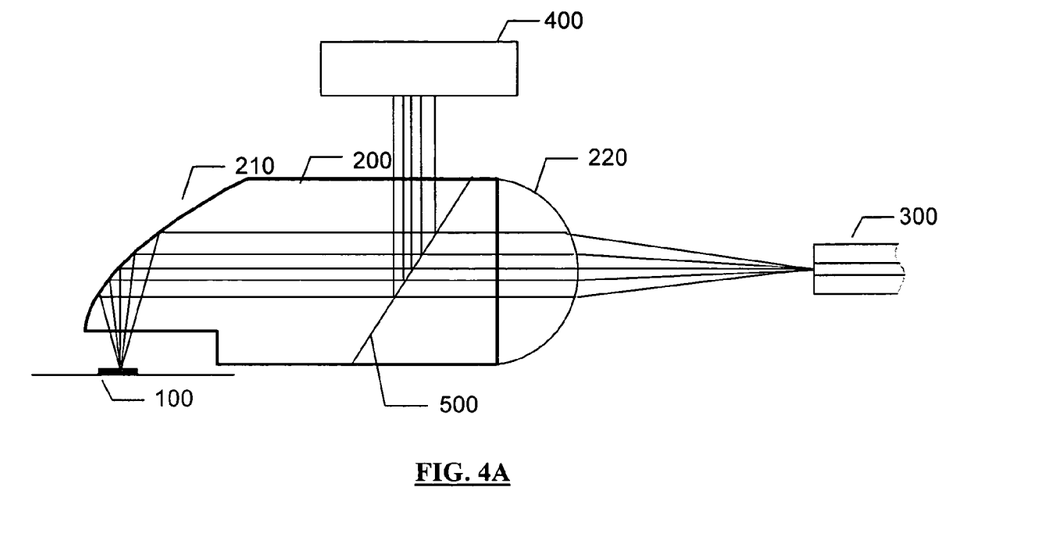
FIGS. 4A and 4B depict an optical assembly incorporating a lens assembly and a monitoring unit according to an embodiment of the present invention.
Figure 4B:
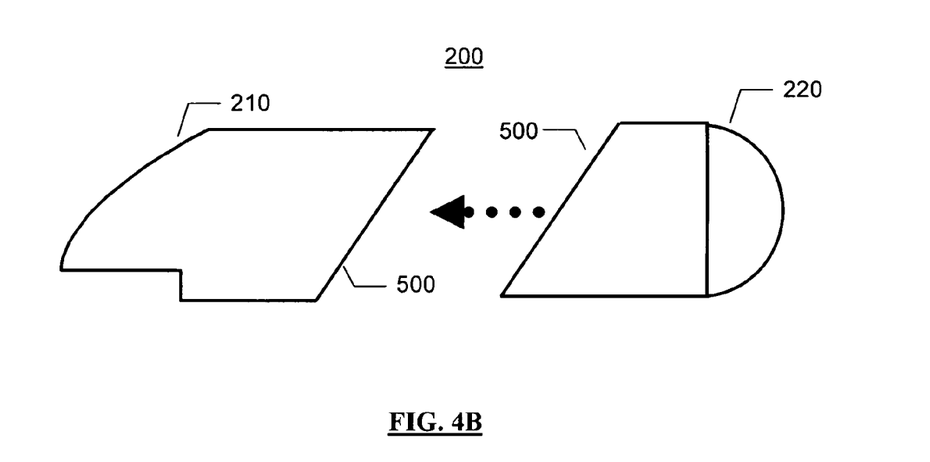

FIGS. 4A and 4B depict an embodiment of the present invention where the lens 200 is implemented as a lens assembly. The lens assembly includes two mating parts. The first part includes the curved reflective surface 210. The second part includes the focusing surface 220. The mating parts include mating surfaces 500, all or a portion of which may be made partially reflective through the use of a reflective coating or by adjusting the dielectric constant of the second mating part. The reflective surface 500 is located in the path of the beam. It transmits a majority of the beam to the focusing surface. However, a portion of the beam may be reflected along a monitoring path to a monitoring unit 400.

Figure 5A:
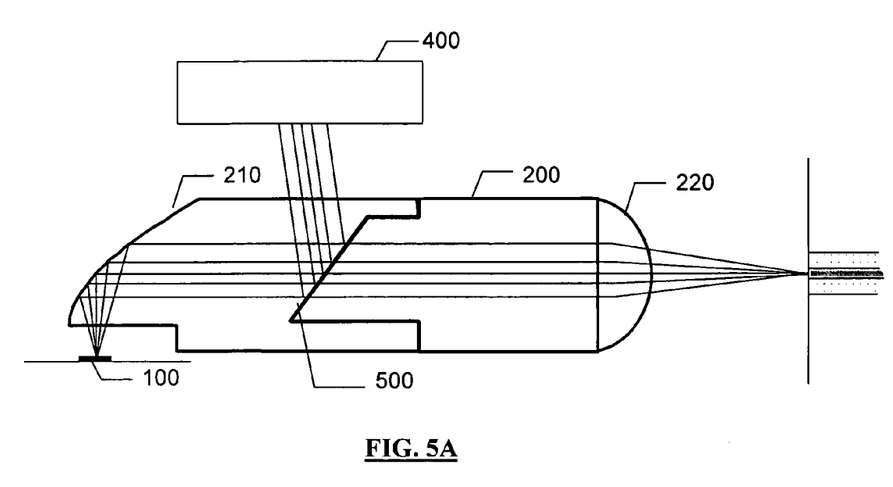
FIGS. 5A and 5B depict an optical assembly incorporating a lens assembly and a monitoring unit according to another embodiment of the present invention.
Figure 5B:
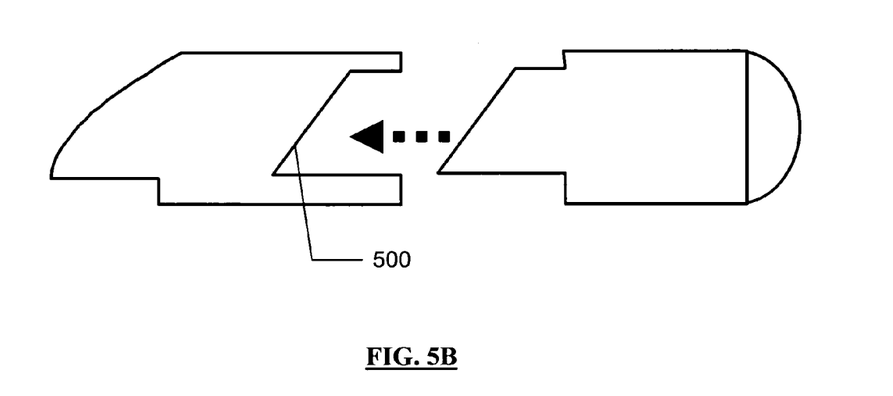

FIGS. 5A and 5B depict another embodiment of the present invention where the lens 200 is implemented as a lens assembly. The mating parts of the assembly include mating surfaces 500. A portion of at least one of the mating surfaces 500 is reflective and is in the path of the beam. The mating surfaces 500 may further include alignment surfaces that facilitate aligning the parts of the lens 200 relative to each other. The reflective portion of the surface 500 reflects the beam along a monitoring path toward a monitoring unit 400.

Figure 6:
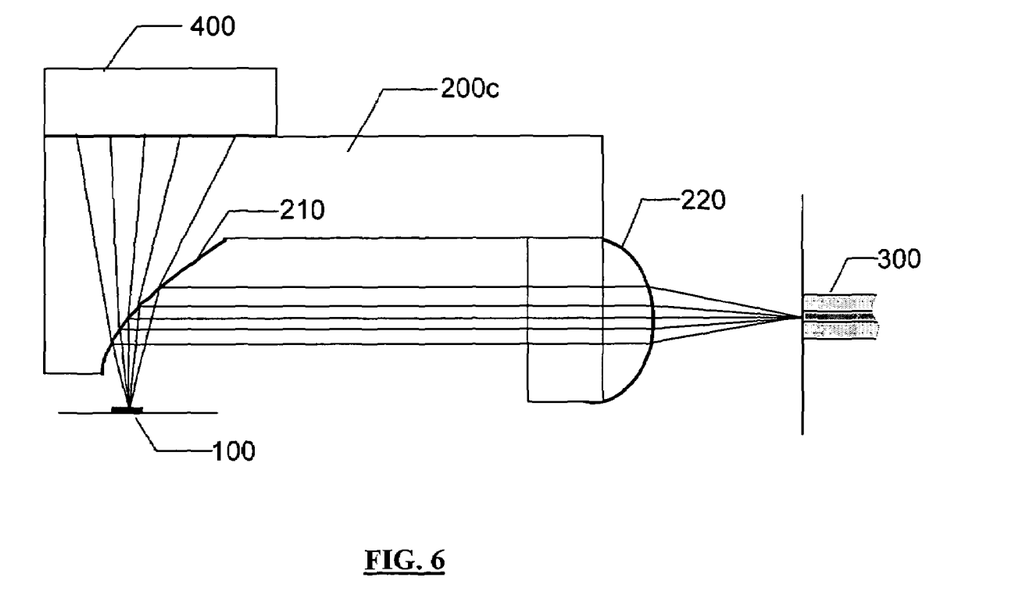
FIG. 6 depicts an optical assembly including a monitoring unit according to an embodiment of the present invention.

FIG. 6 depicts another embodiment of the present invention where the lens 200c is implemented as a negative counterpart of lens 200. The optical device transmits a beam that is traveling across the space between the optical device and the lens toward the curved reflecting surface 210. The light beam is reflected off at the curved, reflective surface 210 and travels toward the focusing surface 220 along the length of the lens. According to this embodiment, the beam is externally reflected off of the reflective surface 210. A portion of the beam may be transmitted through the curved reflective surface toward the monitoring unit 400 which is sitting on top of lens 200c. The curved reflective surface may include a dielectric or metallic coating used to adjust the reflectivity of the curved reflective surface and determine the amount of the beam that is transmitted to the monitoring unit 400. The monitoring unit may be used to receive the transmitted portion of the beam and monitor at least one parameter associated with the beam.

According to alternative embodiments of the invention, a fiber may be embedded within a ferrule. The ferrule may also be positioned by abutting a distal end against an engaging surface of the fiber portion of the passageway. According to this embodiment, the fiber may abut against the engaging surface of the block 310. In this manner, the edge of the fiber may be abutted against the block and therefore positioned at or around the focal point of the lens 200.

While specific embodiments of the present invention have been shown and described, it will be understood by those having ordinary skill in the art that changes may be made to those embodiments without departing from the spirit and scope of the present invention.

What is claimed is:

1. An optical assembly for coupling an optical device to an optical fiber, comprising:

a lens comprising a reflecting curved surface for bending and confining a light beam and a focusing curved surface for focusing the light beam, the lens conveying the light beam between the optical device and the optical fiber by reflection off of the reflecting curved surface and transmission through the focusing curved surface, wherein the lens includes an elongated, non-spherical section and the path of the light beam traverses the elongated, non-spherical section between the reflecting curved surface and the focusing curved surface;

wherein the lens is a lens assembly having at least two mating parts, a first mating part including the reflecting surface and a second mating part including the focusing surface, and wherein each of the first and second mating parts include at least one substantially flat mating surface for engaging each other and the substantially flat mating surfaces are in the optical path of the beam, and at least one of the substantially flat mating surfaces has a reflective portion shaped to reflect a portion of the beam along a monitoring path.

2. The optical assembly according to claim 1, wherein the reflecting curved surface and the focusing curved surface are part of an integrated lens.

3. The optical assembly according to claim 1, wherein the reflecting curved surface controls a divergence angle of the reflected beam before being focused by the focusing curved surface.

4. The optical assembly according to claim 1, further comprising:
a monitoring unit;
and wherein the reflecting curved surface transmits a portion of the beam along a monitoring path to the monitoring unit.

5. The optical assembly according to claim 1, wherein the mating surfaces each include at least one alignment surface that facilitates alignment of the mating surfaces during engagement.

6. The optical assembly according to claim 5, wherein the reflective portion of at least one of the mating surfaces includes a coating to create reflection of the beam.

7. The optical assembly according to claim 1, wherein a monitoring unit monitors at least one property of the beam.

8. The optical assembly according to claim 1, further comprising:
a translucent block positioned between the lens and the end of a fiber, the translucent block reducing backward propagation of the beam toward the optical device.

9. The optical assembly according to claim 8, wherein the block has an engaging surface for engaging the end of the optical fiber and wherein a focusing point of the focusing surface is coincident with the engaging surface.

10. The optical assembly according to claim 1, wherein the optical device is a light device and the optical receiver is an optical fiber for sending out the light.

11. The optical assembly according to claim 1, wherein the optical device is an optical fiber and the optical receiver is a light receiving device.

12. The optical assembly according to claim 1, wherein the curved reflecting surface is a parabolic surface.

13. The optical assembly according to claim 1, wherein the curved focusing surface is a spherical surface.

14. The optical assembly according to claim 1, wherein the curved reflecting surface internally reflects the beam into a material that comprises the lens.

15. The optical assembly according to claim 1, wherein the curved reflecting surface externally reflects the beam off of a material that comprises the lens.

16. The optical assembly according to claim 1, wherein the reflecting surface bends the light beam 90 degree.

17. The optical assembly according to claim 1, wherein the reflecting surface collimates the light beam after the reflection.

* * * * *